(12) United States Patent
Parker et al.

(10) Patent No.: US 7,099,121 B2
(45) Date of Patent: Aug. 29, 2006

(54) PERPENDICULAR MAGNETIC RECORDING HEAD HAVING A REDUCED FIELD UNDER THE RETURN POLE AND MINIMAL EDDY CURRENT LOSSES

(75) Inventors: Gregory John Parker, Warrendale, PA (US); Thomas McLendon Crawford, Pittsburgh, PA (US); Robert Earl Rottmayer, Wexford, PA (US); Petrus Antonius van der Heijden, Cranberry Township, PA (US); Sharat Batra, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 301 days.

(21) Appl. No.: 10/442,460

(22) Filed: May 21, 2003

(65) Prior Publication Data

US 2003/0227714 A1    Dec. 11, 2003

Related U.S. Application Data

(60) Provisional application No. 60/386,772, filed on Jun. 6, 2002.

(51) Int. Cl.
G11B 5/39 (2006.01)
G11B 5/127 (2006.01)

(52) U.S. Cl. .................. 360/317; 360/125
(58) Field of Classification Search ............. 360/125, 360/126, 317, 122
See application file for complete search history.

(56) References Cited

U.S. PATENT DOCUMENTS

| | | | |
|---|---|---|---|
| 4,317,148 A * | 2/1982 | Chi ........................... 360/119 |
| 4,541,026 A | 9/1985 | Bonin et al. |
| RE33,949 E * | 6/1992 | Mallary et al. ............. 360/110 |
| 5,157,570 A * | 10/1992 | Shukovsky et al. ......... 360/126 |
| 5,739,991 A * | 4/1998 | Matono et al. ............. 360/317 |
| 5,808,973 A * | 9/1998 | Tanaka ........................ 369/14 |
| 5,995,341 A * | 11/1999 | Tanaka et al. .............. 360/125 |
| 6,018,862 A | 2/2000 | Stageberg et al. |
| 6,195,233 B1 * | 2/2001 | Akiyama et al. ........... 360/126 |
| 6,317,290 B1 | 11/2001 | Wang et al. |
| 6,728,065 B1 * | 4/2004 | Batra et al. ................. 360/126 |
| 2001/0013992 A1 | 8/2001 | Tagawa et al. |
| 2002/0036863 A1 * | 3/2002 | Takeo et al. ................ 360/125 |
| 2002/0071208 A1 | 6/2002 | Batra et al. |
| 2002/0075586 A1 * | 6/2002 | Dimitrov et al. ............ 360/57 |
| 2002/0176214 A1 * | 11/2002 | Shukh et al. ............... 360/317 |

(Continued)

FOREIGN PATENT DOCUMENTS

JP          56003424 A  *  1/1981

(Continued)

OTHER PUBLICATIONS

U.S. Appl. No. 09/757,837, filed Jan. 10, 2001, Litvinov et al.

*Primary Examiner*—William J Klimowicz
(74) *Attorney, Agent, or Firm*—Robert P. Lenart, Esq.; Pietragallo, Bosick & Gordon LLP

(57) ABSTRACT

A perpendicular magnetic recording head comprises a write pole having a pole tip adjacent to an air bearing surface, a return pole, a pedestal for magnetically coupling the write pole to the return pole, a coil for inducing magnetic flux in the write pole, and a shield for coupling magnetic flux from the coil to the return pole. Disc drives that include such recording heads are also provided.

18 Claims, 4 Drawing Sheets

U.S. PATENT DOCUMENTS

| | | |
|---|---|---|
| 2003/0021064 A1 | 1/2003 | Ohtomo et al. |
| 2003/0117749 A1* | 6/2003 | Shukh et al. ............... 360/317 |
| 2005/0068671 A1* | 3/2005 | Hsu et al. .................. 360/125 |
| 2005/0105213 A1* | 5/2005 | Takeo et al. ................ 360/125 |

FOREIGN PATENT DOCUMENTS

| | | | | |
|---|---|---|---|---|
| JP | 57018010 A | * | 1/1982 | |
| JP | 59218616 A | * | 12/1984 | |
| JP | 60040511 A | * | 3/1985 | |
| JP | 60173711 A | * | 9/1985 | |
| JP | 01159814 A | * | 6/1989 | |
| JP | 04251406 A | * | 9/1992 | |
| JP | 05062124 A | * | 3/1993 | |
| JP | 05101301 A | * | 4/1993 | |
| JP | 05101310 A | * | 4/1993 | |
| JP | 07225912 A | * | 8/1995 | |

* cited by examiner

PERPENDICULAR MAGNETIC RECORDING HEAD HAVING A REDUCED FIELD UNDER THE RETURN POLE AND MINIMAL EDDY CURRENT LOSSES

CROSS-REFERENCE TO RELATED PATENT APPLICATION

This application claims the benefit of U.S. Provisional Patent Application Ser. No. 60/386,772, filed Jun. 6, 2002.

FIELD OF THE INVENTION

This invention relates to magnetic data storage devices, and more particularly, to recording heads for perpendicular magnetic recording and devices that include such recording heads.

BACKGROUND OF THE INVENTION

The expectation in the hard disc drive industry is that areal density will increase at compound annual growth rate (CAGR) of >60% and an annual increase in data rate of greater than 40% for the foreseeable future. To reduce media noise and provide a sharper transition for longitudinal recording systems, a higher coercivity and lower magnetic thickness (Mrt) media is preferred. The magnetic thickness is the product of media's remnant magnetic moment (Mr) and its physical thickness (t). As a result of reducing the Mrt of the media, which reduces the media grain volume, the media may switch its magnetization due to thermal excitation (the super-paramagnetic effect). Further, demagnetization fields are higher at higher linear density. This higher demagnetization field makes the onset of the super-paramagnetic effect even faster by decreasing the energy barrier between the two states of magnetization for the grains.

Perpendicular recording offers an advantage because the transition width is defined by the gradient of the head field, which should be intrinsically larger than the gradient for a corresponding longitudinal head. Because of near perfect orientation of the perpendicular media, and the fact that the demagnetization field stabilizes transitions when they are brought closer together, perpendicular media can provide lower media noise. Further, perpendicular media is relatively thick compared to longitudinal media, which should improve the thermal stability. In principle, perpendicular recording can offer a gain factor of 4 to 5 over longitudinal recording for the same criteria of thermal stability and signal-to-noise ratio (SNR).

Perpendicular recording heads include a write pole and a return pole which are coupled by a yoke or pedestal. Electric current in a coil positioned around the yoke or pedestal creates a magnetic field in the poles that is used to affect the magnetization of an associated magnetic storage medium. In conventional perpendicular heads there is a significant magnetic field under the return pole. The field under the return pole has to be minimized so that it is significantly below the nucleation field (Hn) of the media to avoid corrupting data on neighboring tracks. The field under the return pole will effectively lower the energy barrier between the two magnetic states, requiring a higher thermal stability factor to avoid possible corruption of data.

By increasing the thickness of the return pole, the field under the return pole can be reduced. However, there is still a large field at the trailing end of the return pole. In addition, a thicker return pole will deteriorate the high frequency performance for the writer. Eddy currents generated in thicker films will limit the high frequency performance of the writer.

Thus there is a need for a perpendicular magnetic recording head that has a reduced field under the return pole and minimal eddy current losses.

SUMMARY OF THE INVENTION

This invention provides a perpendicular magnetic recording head comprising a write pole having a pole tip adjacent to an air bearing surface, a return pole, a pedestal for magnetically coupling the write pole to the return pole, a coil for inducing magnetic flux in the write pole, and a shield for coupling magnetic flux from the coil to the return pole. The shield can be positioned between the coil and the air bearing surface.

The coil can be a single turn coil. The shield can comprise a rectangular structure of magnetic material, and can be positioned between a first conductor of the coil and the air bearing surface. A layer of insulating material can be positioned between the write pole and the shield. The return pole can have a thickness of less than two times the skin depth of the material used for the return pole. The recording head can further include a read portion having a shared shield positioned parallel to the return pole, and a layer of insulating material positioned between the return pole and the shared shield, wherein the return pole is magnetostatically coupled to the shared shield.

In another aspect, this invention encompasses disc drives that include perpendicular magnetic recording heads comprising a write pole having a pole tip adjacent to an air bearing surface, a return pole, a pedestal for magnetically coupling the write pole to the return pole, a coil for inducing magnetic flux in the write pole, and a shield for coupling magnetic flux from the coil to the return pole.

DETAILED DESCRIPTION OF THE INVENTION

Figure 1:
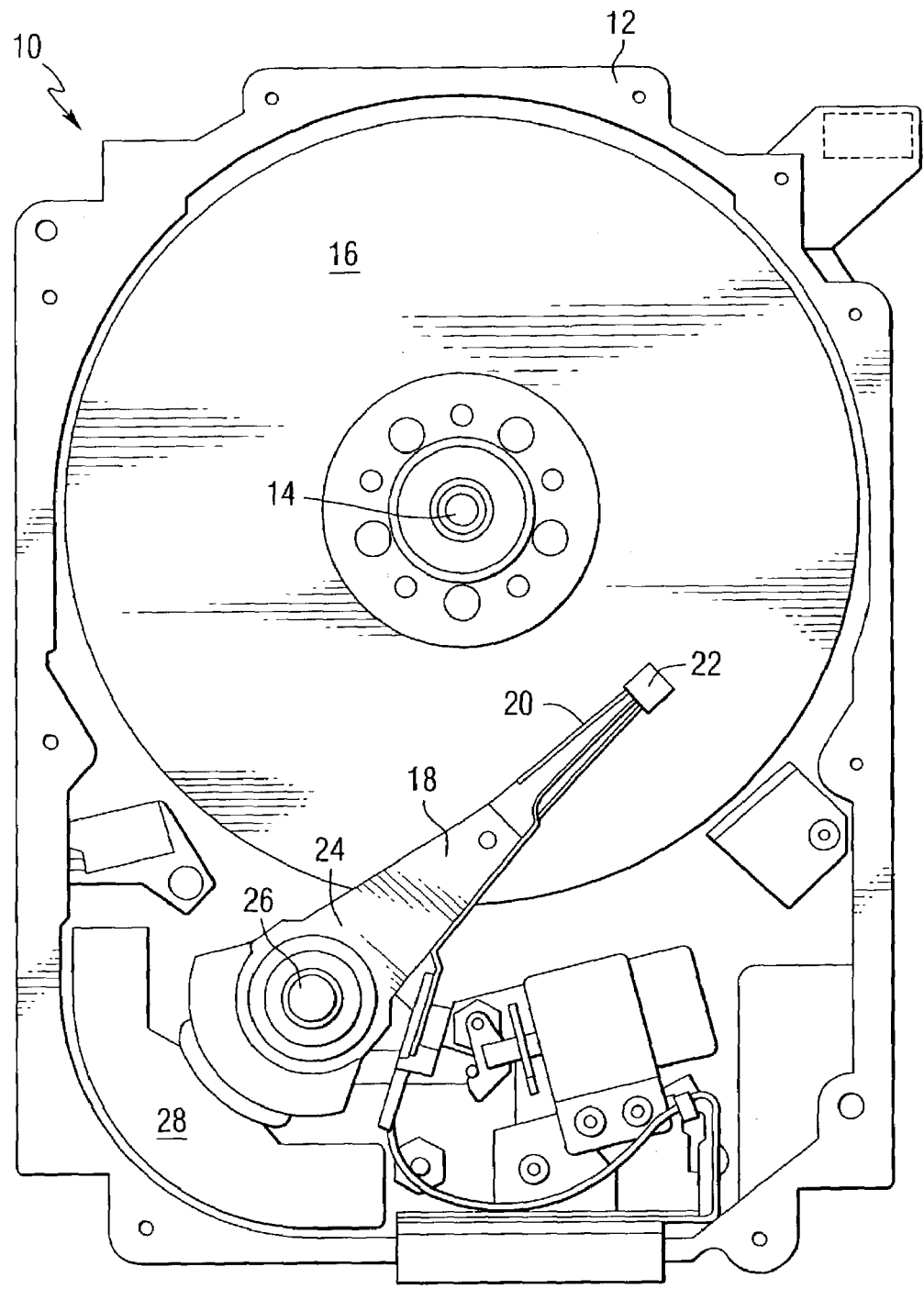
FIG. 1 is a pictorial representation of a magnetic disc drive that can include magnetic heads constructed in accordance with this invention.

Referring to the drawings, FIG. 1 is a pictorial representation of a disc drive 10 that can utilize magnetic recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

Figure 2:
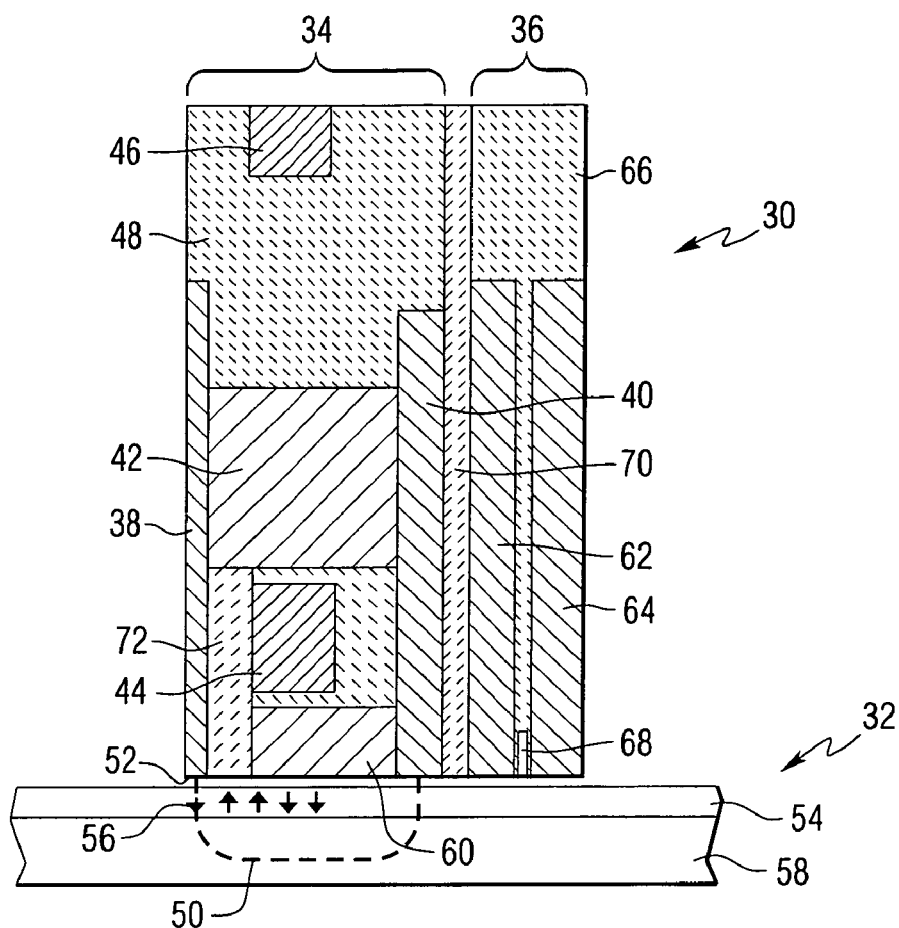
FIG. 2 is a cross-sectional view of a perpendicular magnetic recording head constructed in accordance with this invention, and a portion of an associated perpendicular magnetic storage medium.

FIG. 2 is a cross-sectional view of a perpendicular magnetic recording head 30 and a portion of an associated perpendicular magnetic storage medium 32. The magnetic recording head 30 includes a writer 34 and a reader 36. The writer includes a write pole 38 and a return pole 40 magnetically coupled by a pedestal 42. A single turn coil comprising conductors 44 and 46 encircles the pedestal and is supported by an insulator 48. A current in the coil induces a magnetic field in the pedestal and the poles. Magnetic flux 50 exits the recording head at the air bearing surface 52 and is used to change the magnetization of portions of a magnetically hard layer 54 of the storage medium 32, as illustrated by arrows 56. A magnetically soft underlayer 58 provides a path for the magnetic flux. A magnetic shield 60, also referred to as a second pedestal, is provided in the recording head adjacent to the air bearing surface, and between coil conductor 44 and the air bearing surface to prevent the magnetic field surrounding conductor 44 from entering the air gap. The shield 60 is magnetically coupled to the return pole 40. A layer of insulating material 72, also called the gap layer, is positioned between the write pole and the shield adjacent to the air bearing surface.

The reader 36 includes shields 62 and 64 separated by insulation 66. A read element, such as a magnetoresistive sensor 68 is embedded in the insulation adjacent to the air bearing surface 52. A layer of insulation 70 separates the writer and the reader.

Figure 3:
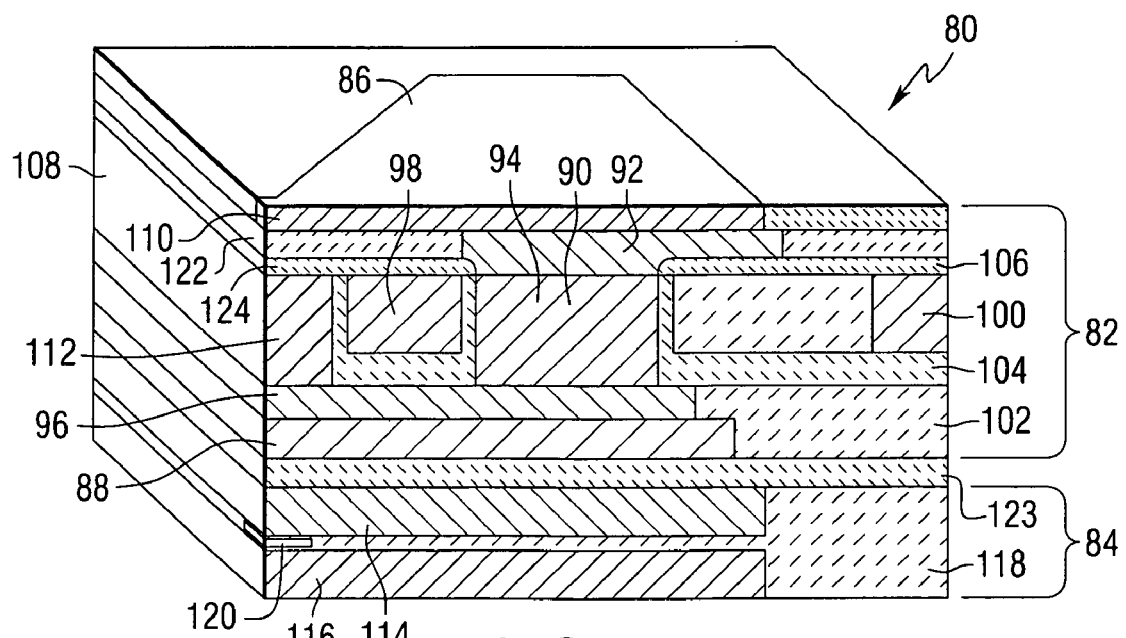
FIG. 3 is a cross-sectional view of another perpendicular magnetic recording head constructed in accordance with this invention.

FIG. 3 is an isometric view of another perpendicular magnetic recording head 80 constructed in accordance with the invention. The magnetic recording head 80 includes a writer 82 and a reader 84. The writer includes a write pole 86 and a return pole 88 magnetically coupled by a pedestal 90. The pedestal 90 includes three layers 92, 94 and 96. A single turn coil comprising a first conductor 98 and a ground plane conductor 100 encircles the pedestal and is supported by an insulator formed in several layers 102, 104 and 106. A current in the coil induces a magnetic field in the pedestal and the poles. Magnetic flux exits the recording head at the air bearing surface 108 and is used to change the magnetization of portions of a magnetically hard layer of an associated storage medium. The width of the end 110 of the write pole defines the track width. A magnetic shield 112 is provided in the recording head between coil conductor 98 and the air bearing surface to prevent the magnetic field surrounding conductor 98 from entering the air gap. Shield 112 is magnetically coupled to the return pole 88 through a layer 96 of the pedestal. In this example, the shield includes an edge positioned adjacent to the air bearing surface. However, the shield need not be at the air bearing surface. Two layers of insulating material 122 and 124, also called the gap layers, are positioned between the write pole and the shield adjacent to the air bearing surface. The poles and pedestal can be made of, for example CoFe. The insulating layers can be made of, for example $Al_2O_3$.

The reader 84 includes shields 114 and 116 separated by insulation 118. A read element, such as a magnetoresistive sensor 120 is embedded in the insulation adjacent to the air bearing surface 108. A layer of insulation 123 separates the writer and the reader. Insulation 123 can include, for example, 200 nm thick $Al_2O_3$. Shield 114 is also called a shared shield.

In a conventional perpendicular recording head design, the majority of the magnetic field under the return pole is caused not by 'flux closure' from the write pole through the magnetically soft underlayer (SUL) back to the return pole, but is due mainly to the coil being placed close to the ABS and therefore close to the SUL. The small field generated by the coil is enough to produce an additional field under the return pole due to the relatively larger permeability of the SUL and the return pole.

The recording heads of this invention decrease the magnetic field coupling from the coil to SUL by including a means for coupling this field to the return pole. In the examples of FIGS. 2 and 3, this means comprises a shield extending from the return pole at the ABS towards the write pole. The field from the coil will couple into the shield instead of the SUL and therefore the field under the return pole is reduced.

The recording heads of this invention can be integrated read and write heads that include a thin return pole separated from a shield in the read portion of the head, for example by 200 nm of insulating material ($Al_2O_3$). The read head sensor can be sandwiched between two shields, in the form of large slabs of soft magnetic material, very similar to the return pole. From high frequency requirements, the pole's thickness (down track) should be on the order of the 'skin depth' of the material. The 'skin depth' is a computable or measurable quantity that tells how far incident radiation penetrates a solid. This is typically 100's of nm for metallic magnetic materials. The write and return pole thicknesses should not be much thicker than the skin depth to prevent electrical currents ('Eddy currents') which slow or modify the magnetic response. Thus the return pole thickness should be kept below two times the skin depth in either the cross-track or the down track directions to avoid any reduction in the head efficiency at high frequencies.

Referring to FIG. 3, the separation between the return pole 88 and the read sensor shield 114 is such that the two poles are magnetostatically coupled. This magnetostatic coupling increases the effective area for the return pole, consequently reducing the field under the return pole that is proportional to the effective area of the return pole at the ABS. The shield 112 at the ABS must be magnetically coupled to the return pole. Processing considerations may require that the first pedestal 90 extends to the ABS. In the example of FIG. 3, a layer 96 of the pedestal extends to the ABS and lies between the shield and the return pole. Since the first pedestal is magnetic, the shield is magnetically coupled to the return pole through the layer 96 of the pedestal.

The minimum distance between the shield 112 and the write pole 86 depends on the head-to-keeper spacing (the gap distance from the ABS to the soft underlayer in conventional perpendicular media). In a write head, the magnetic flux has to 'jump' across this gap, and then travel in the soft underlayer of the recording medium to a location under the return pole. Then the flux jumps back into the return pole to complete the circuit. Assuming perfect materials, the gap between the write pole and the shield at the ABS should be about two times the head-to-keeper distance. Other factors that affect the minimum write pole to shield distance include the thickness of the shield, the width of the write pole, the position of the shield, and the permeability of the materials.

It may be possible to reduce the gap from twice the head-to-keeper spacing to about 1.5 times the head-to-keeper spacing.

The recording heads of this invention also reduce the field at the trailing edge of the return pole. A reduction in the field at the trailing edge of the return pole is required to avoid corrupting neighboring tracks.

Figure 4:
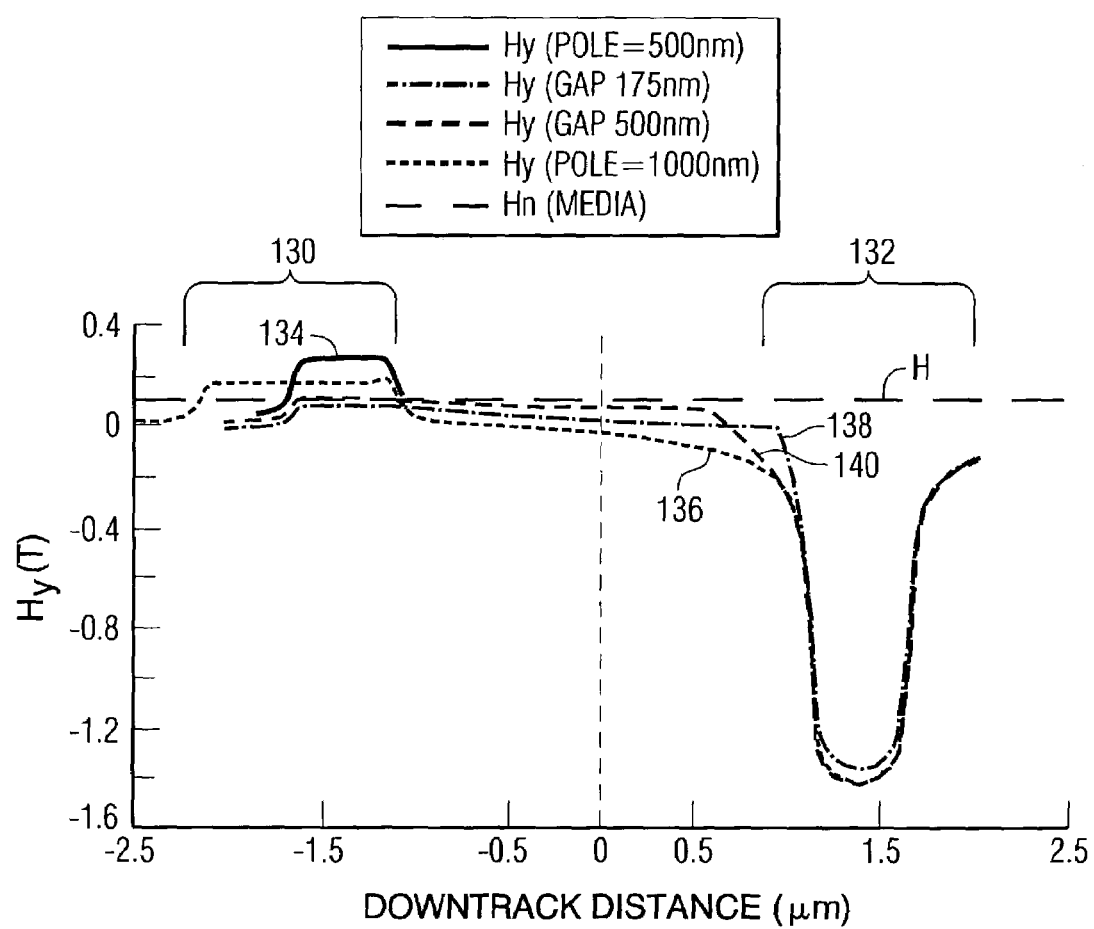
FIG. 4 is a graph showing a comparison of the down track field profile for conventional perpendicular head and the head constructed according to the invention.

FIG. 4 is a graph showing a comparison of the down track field profile for a conventional perpendicular head and the head constructed according to the present invention for two different gaps (175 nm and 500 nm) between the write pole and the shield. The pole thickness for the return pole was 500 nm and 1000 nm for the conventional head and 500 nm for the present invention for both gaps.

The data in FIG. 4 shows that the invention reduces the field under the return pole. The field under the return pole is illustrated in region 130, and the field under the main pole is illustrated in region 132. The lines in FIG. 4 show the magnitude of the perpendicular field inside the media along the down track direction, on the center of the track. Line 134 shows data for a recording head having the problem which is solved by this invention. On the left side of the graph, the small bump occurs at the position of the return pole. This field is small compared to the write field but is sufficient to partially write (accidentally flip) the media. This will eventually destroy the data. Line 136 shows what happens if the return pole thickness is increased (or equivalently if one reader shield is included). The other two curves 138 and 140 show data for a head having a shield between the coil and the ABS, but with different distances between the shield and the inside of the write pole.

Figure 5:
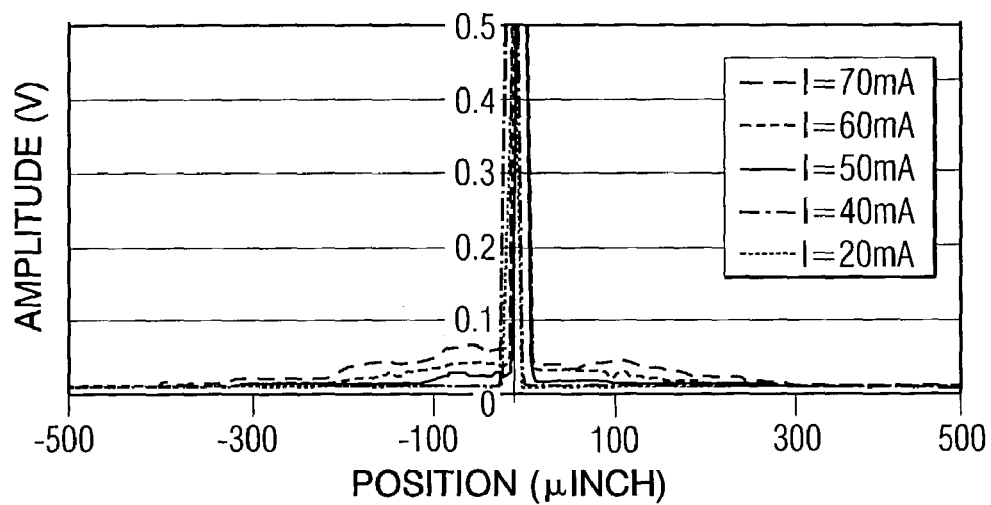
FIG. 5 is a graph showing the off-track writing field for a writer only device.
Figure 6:
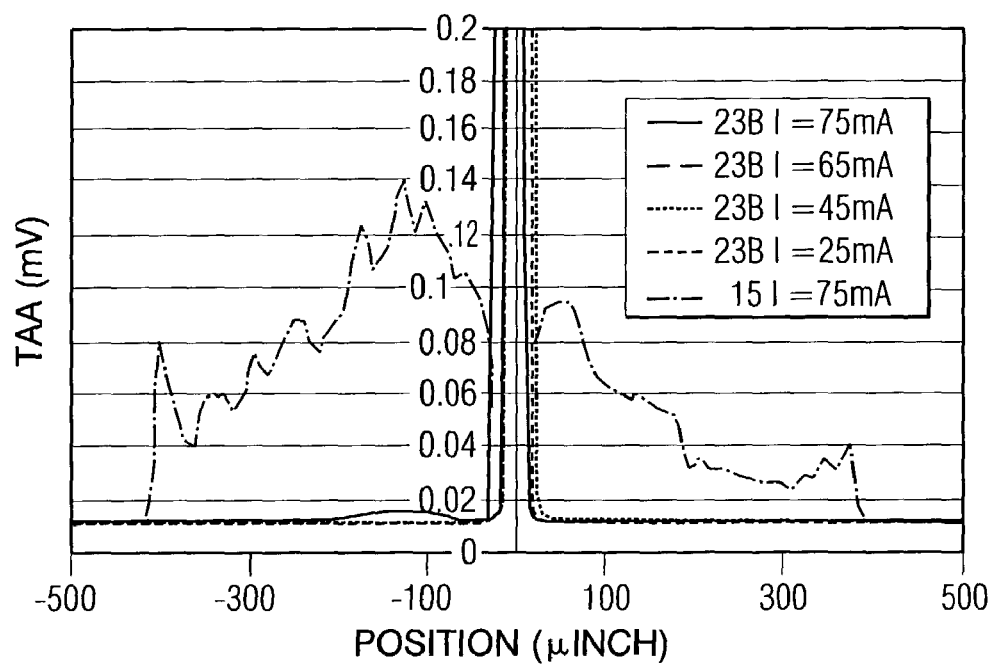
FIG. 6 is a graph showing the cross-track field profile for a writer only and a writer on top of a reader.

FIG. 5 is a graph showing the cross-track writing field for writer only devices. FIG. 6 is a graph showing the cross-track field profile for a writer only and a writer on top of a reader. The cross-track profiles confirm that the return pole writing that is observed with a writer only head is substantially reduced for integrated writers. This provides confirmation of the modeling that a large area for the return pole will reduce the magnetic field under the return pole. Even though the return pole for the writer is the same for both of the heads, the effective area of return pole for the integrated writer is larger due to magnetostatic coupling between the return pole and the shared shield. This reduces the field under the return pole without degrading the high frequency performance of the writer.

The data in FIGS. 5 and 6 show that placing a reader (and its shields) adjacent to the return pole improves performance. The return pole and the reader shield are close together compared to their size and act as if they were connected. This has the same effect as having a thicker (down track) return pole. The peaks FIGS. 5 and 6 near the zero point of the horizontal axis are the actual written track. The wide part further from the zero point is corrupted data that was written by the return pole. An ideal curve would be zero except for on the written track.

In recording heads constructed according to this invention, the field under the return pole is reduced substantially below the nucleation field ($\geq 0.1$ T) of the media even under the trailing edge of the return pole. With the field under the return pole below the nucleation field, writing from the return pole is eliminated.

We have found that in conventional perpendicular recording heads, the magnetic field surrounding the coil can directly couple into the media's soft underlayer. This coupling produces extra magnetic field under the return pole that can have sufficient strength to overwrite data that was written on the media. By putting a shield between the coil and the ABS, the coil couples directly to the shield (instead of the media) and the magnetic field under the return pole is reduced significantly.

While the present invention has been described in terms of several examples, it will be apparent to those skilled in the art that various changes can be made to the disclosed examples without departing from the scope of the invention as defined by the following claims.

What is claimed is:

1. A perpendicular magnetic recording head comprising:
   a write pole having a pole tip adjacent to an air bearing surface;
   a return pole;
   a pedestal for magnetically coupling the write pole to the return pole;
   a coil for inducing magnetic flux in the write pole;
   a first shield positioned between the coil and the air bearing surface for coupling magnetic flux from the coil to the return pole; and
   a read portion having a read element and a second shield positioned between the read element and the return pole, wherein the return pole is magnetostatically coupled to the second shield.

2. The magnetic recording head of claim 1, wherein the first shield is positioned at the air bearing surface.

3. The magnetic recording head of claim 1, wherein the first shield comprises a rectangular structure of magnetic material.

4. The magnetic recording head of claim 1, wherein the coil comprises a single turn coil including first and second conductors, and wherein the first shield is positioned between the first conductor and the air bearing surface.

5. The magnetic recording head of claim 1, wherein the return pole has a thickness of less than two times the skin depth of the return pole.

6. The magnetic recording head of claim 5, wherein the thickness of the return pole is measured in one of the cross-track direction or the down track direction.

7. An apparatus comprising:
   a motor for rotating a storage medium; and
   an arm for positioning a recording head adjacent to a surface of the storage medium;
   wherein the recording head includes a write pole having a pole tip adjacent to an air bearing surface, a return pole, a pedestal positioned between the write pole to the return pole, a coil, a first shield positioned between the coil and the air bearing surface for coupling magnetic flux from the coil to the return pole, and a read portion having read element and a second shield positioned between the read element and the return pole, wherein the return pole is maanetostatically coupled to the second shield.

8. The apparatus of claim 7, wherein the first shield is positioned adjacent to the air bearing surface.

9. The apparatus of claim 7, wherein the first shield comprises a rectangular structure of magnetic material.

10. The apparatus of claim 7, wherein the coil comprises a single turn coil including first and second conductors, and wherein the first shield is positioned between the first conductor and the air bearing surface.

11. The apparatus of claim 7, wherein the return pole has a thickness of less than two times the skin depth of the return pole.

12. The apparatus of claim 11, wherein the thickness of the return pole is measured in one of the cross-track direction or the down track direction.

13. A perpendicular magnetic recording head comprising:
- a write pole having a pole tip adjacent to an air bearing surface;
- a return pole;
- a pedestal between the write pole to the return pole;
- a coil;
- a first shield positioned between the coil and the air bearing surface for coupling magnetic flux from the coil to the return pole; and
- a read portion having a read element and a second shield positioned between the read element and the return pole, wherein the return pole is magnetostatically coupled to the second shield.

14. The magnetic recording head of claim 13, wherein the first shield is positioned at the air bearing surface.

15. The magnetic recording head of claim 13, wherein the first shield comprises a rectangular structure of magnetic material.

16. The magnetic recording head of claim 13, wherein the coil comprises a single turn coil including first and second conductors, and wherein the first shield is positioned between the first conductor and the air bearing surface.

17. The magnetic recording head of claim 13, wherein the return pole has a thickness of less than two times the skin depth of the return pole.

18. The magnetic recording head of claim 17, wherein the thickness of the return pole is measured in one of the cross-track direction or the down track direction.

* * * * *